Aug. 30, 1927.

I. O. THORLEY 1,640,628

TRANSMISSION GEAR SET

Filed Dec. 13, 1926    2 Sheets-Sheet 1

Inventor

Ira Otis Thorley.

By

Attorney

Aug. 30, 1927.
I. O. THORLEY
1,640,628
TRANSMISSION GEAR SET
Filed Dec. 13, 1926    2 Sheets-Sheet 2
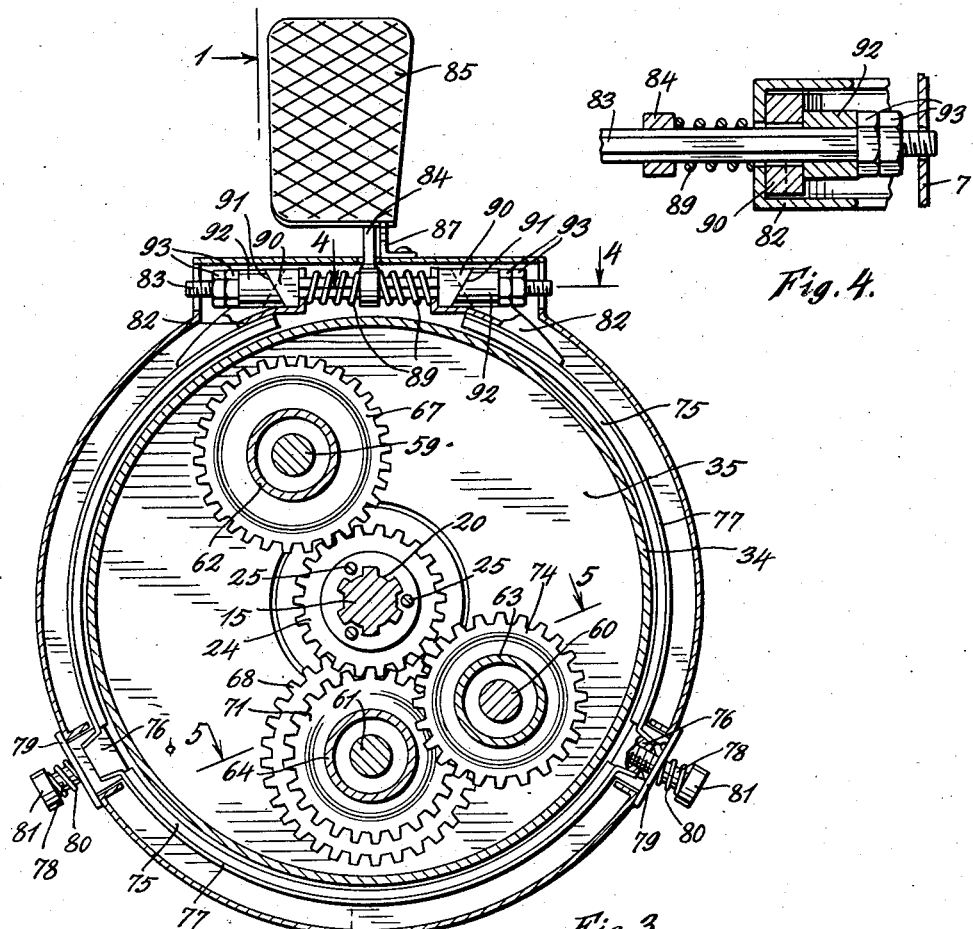
Fig. 4.
Fig. 3.
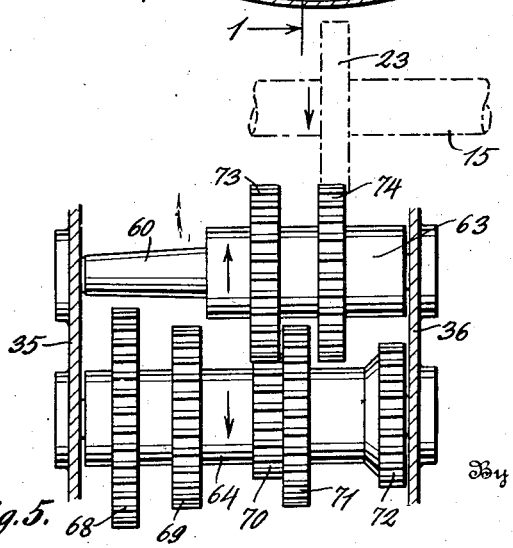
Fig. 5.
Inventor
Ira Otis Thorley.
By A. J. O'Brien
Attorney Patented Aug. 30, 1927.

1,640,628

UNITED STATES PATENT OFFICE.

IRA OTIS THORLEY, OF DENVER, COLORADO.

TRANSMISSION-GEAR SET.

Application filed December 13, 1926. Serial No. 154,400.

This invention relates to improvements in transmission gear sets of the type known as a planetary gear.

It is the object of this invention to produce a transmission mechanism in which are combined planetary gears, variable speed gears, shifting mechanism and a clutch which can also be used for a service brake.

My invention briefly described, consists of a casing or housing having rotatably mounted therein axially aligned driving and driven shafts about the centers, of which is rotatably mounted a cylindrical drum within which are mounted three countershafts which carry gears that are driven from the driving shaft. Two gears are slidably but non-rotatably mounted on the driven shaft and can be moved selectively into engagement with certain of the gears on the counter shafts so as to produce a variation in the speed ratio or a reverse rotation of the driven shaft. A brake band encircles the cylindrical drum and serves to hold the latter against rotation while running in gears or during reverse operation and which serves as a brake when the driving and driven shafts are directly connected.

Having now briefly described my invention, I will proceed to describe the same in detail and for this purpose reference will be had to the accompanying drawings in which the preferred embodiment thereof has been illustrated, and in which:

Fig. 3 is a section taken on line 3—3, Fig. 1;

Fig. 4 is a section taken on line 4—4, Fig. 3 and shows the mechanism by which the brake band is controlled, and Fig. 5 is a section taken on line 5—5, Fig. 3 and shows the relationship of the reverse gears to the gears on one of the countershafts.

Figure 1:
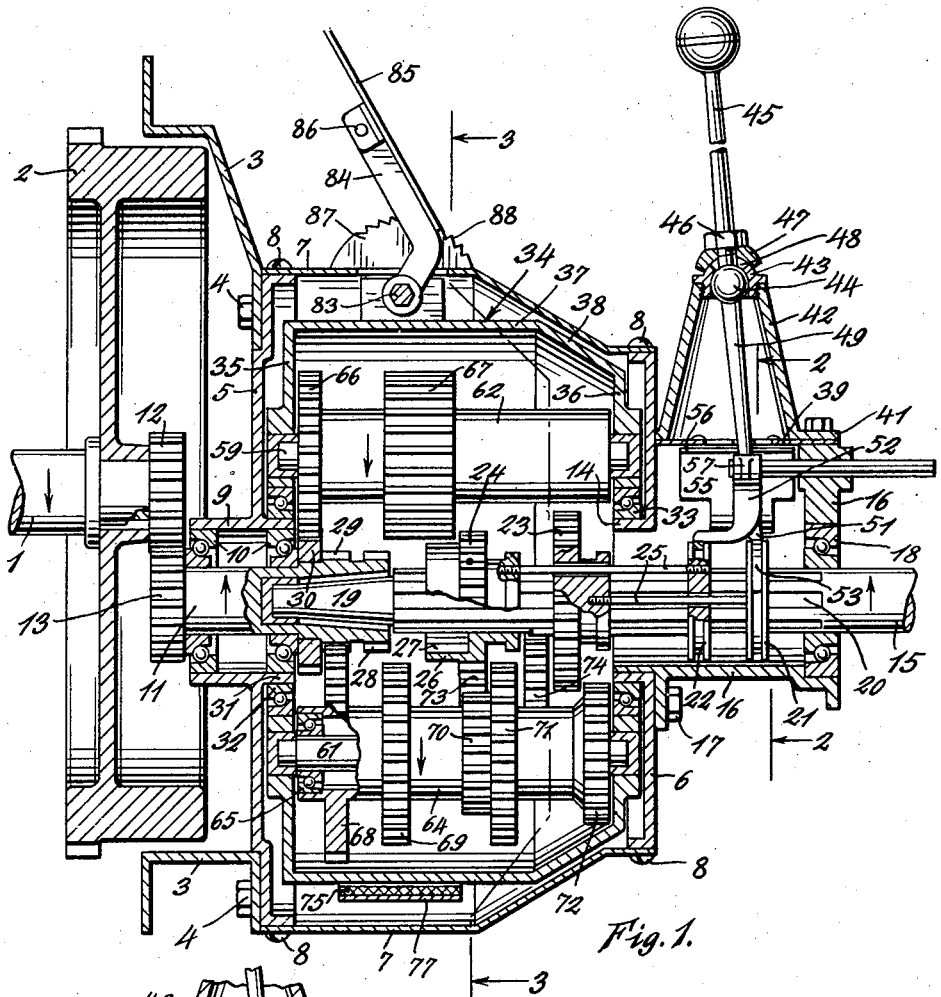
Fig. 1 is a section taken on line 1—1, Fig. 3 and shows the parts in neutral position.

In the drawing numeral 1 designates the crank shaft of an internal combustion engine or other prime mover with which my transmission gears are associated and 2 represents the fly wheel. Reference numeral 3 indicates a portion of the enclosing casing which surrounds the fly wheel and to which my gear set is attached by means of bolts or screws 4. My improved gear set consists of two end plates or hubs 5 and 6 to the peripheries of which a properly curved sheet metal member 7 is attached by any suitable means as, for example, by screws 8. The plate 5 is provided with a hub 9 within which are located spaced bearings 10 in which the short shaft 11 rotates. The crank shaft 1 has secured to its outer end a gear wheel 12 that meshes with a similar gear 13 on the end of shaft 11. These two gears are not always used but have been shown in the drawing because they are employed in the special embodiment to which this drawing corresponds. It is evident, however, that shaft 11 may be directly coupled to shaft 1 but this requires that these two shafts must be in axial alignment. End plate 6 has a hub portion 14 which forms an opening for the driven shaft 15. A housing 16 is attached to the outer side of the end plate 6 by means of bolts 17. This housing has an opening within which is located a bearing 18 in which the driven shaft 15 is journalled. The other end of shaft 15, which has been indicated by reference numeral 19, is preferably tapered and is journalled in an opening in shaft 11 so that shafts 11 and 15 may rotate relative to each other. The driven shaft 15 is provided with a plurality of longitudinally extending grooves 20 and carries slidable collars 21 and 22 which are connected to the gear wheels 23 and 24 respectively by means of rods 25. The gear wheel 24 is provided with a hub portion 26 on one side thereof and this is provided with internal teeth 27, which are adapted to engage and cooperate with gear teeth 28 on the inner end of shaft 11. Shaft 11 is also provided with a gear 29, which is spaced a short distance from the gear 28 in the manner shown in Fig. 1. A gear 30 is nonrotatably secured to the shaft 11 and lies directly inside of the inner bearing 10. The hub 9 has an inward extension 31 to which the ball raceway 32 is attached. This extension corresponds to the hub 14 on plate 6 which also carries a similar ball raceway which has been designated by numeral 33. The raceways 32 and 33 form parts of the bearings which serve to rotatably support the cylindrical drum which has been designated as a whole by numeral 34. This drum has parallel end plates 35 and 36 whose outer edges are connected by means of a cylindrical portion 37 and a conical part 38. I have not attempted to show the exact construction of this cylindrical drum as my invention relates more particularly to the arrangement of the gears and the general combination which will be hereinafter more fully described, the drum being therefore shown in a more or less diagrammatic manner.

The housing 16 has attached to its upper open end a slotted plate 39 which is clamped between the flanges 40 of the housing 16 and flanges 41 of the conical cover portion 42 to the upper end of which is secured a nut 43 having a spherical cavity for the reception of the ball 44 on the shift lever 45. A nut 46 holds the conical washer 47 in contact with the upper spherical surface 48 of nut 43, so that the lever may have universal movement with respect to the conical cover portion 42. The lower end of lever 45, which has been designated by reference numeral 49, extends through a slot in the plate 39 and engages notches between the fingers 50 of the shifting lugs 51 and 52. Lugs 51 and 52 are provided with arcuate fingers 53, which engage in grooves in the collars 21 and 22 in the manner shown quite clearly in Figures 1 and 2. When the lever is in engagement with the shifting lugs, the collars 21 and 22 may be moved longitudinally on shaft 15 while the latter is rotating and in this manner gears 23 and 24 may also be moved into and out of operative position for a purpose which will be hereinafter explained. Springs 54 are secured to the inside of the casing 16 and have upwardly extending portions 55 which terminate in inwardly extending flanges 56 that are adapted to be engaged by the end 49 of the lever 45 in the manner shown in Figure 2, in which position the parts 55 of the springs are moved outwardly so as to separate them from the shifting lugs with which they are normally in engagement. The shifting lugs are provided with outwardly projecting lugs 57 which are adapted to engage openings in the parts 55 when the gears are in neutral position. It is now evident that by means of the lever 45, the gears 23 and 24 may be selectively shifted on the shaft 15.

Mounted for rotation in the opposite ends 35 and 36 of the drum are three countershafts 59, 60 and 61. Rotatably secured to these countershafts are tubular members 62, 63 and 64, respectively, which are supported from the countershaft by means of bearings like those indicated by reference numeral 65 in Figure 1. The tubular member 62 is provided with two gears, 66 and 67, which have the same pitch diameter. Gear 66 is arranged to mesh with gear 30 on shaft 11 and therefore rotates whenever gear 30 rotates with respect to the drum 34. The gear 67 which is integral with the tubular member 62 also rotates whenever gear 66 rotates. It will be noted that gear 67 is of considerable width. The purpose of this will become apparent as the description proceeds. Secured to or formed integral with the tubular member 64 are gears 68, 69, 70, 71 and 72. These gears are of different sizes and are spaced along the part 64 in the manner shown in Figure 1. In the illustration given, gears 69 and 71 are shown as of the same diameter. Rotatably secured on shaft 60 is the cylindrical member 63 which carries two gears 73 and 74. Gear wheel 73 is constantly in mesh with the gear wheel 70 on member 64 (Fig. 5), while gear wheel 74 is normally disconnected from any of the other gears.

A brake band 75 is secured to the inside of the cylindrical wall 7 in the manner shown in Figure 3, in which lugs 76 have been shown as attached to the metal portion 77 of the brake band. These lugs are provided with threaded openings for the reception of the bolts 78 which pass through a closure 79 in the cylindrical wall 7. Springs 80 extend between the heads 81 of the bolts and the outer surface of the closure 79. This construction serves to hold the brake bands against rotation and also tends to separate the brake band from the outer surface of the drum 34. The ends of the brake band are provided with lugs 82 which are slotted for the reception of the shaft or bolt 83. Secured to the center of this bolt is a pedal 84, by means of which the bolt can be rotated. A plate 85 is pivotally attached to the end of the pedal in the manner indicated at 86 in Figure 1. Secured to the upper surface of the wall 7 is an arcuate toothed plate 87 provided with ratchet teeth 88. The lower end of the plate 85 is adapted to engage with the ratchet teeth 88 for the purpose of holding the parts in adjusted position. Springs 89 are located between the pedal 84 and the adjacent surfaces of the lugs 82; these springs are under compression and tend to separate the lugs so as to move the brake band to inoperative position. It will be observed that the bolt 84 has been shown as hexagonal and the pedal 84 is provided with a hexagonal opening for the reception of this bolt. Located within the lugs 82 are cam members 90 which are provided with opposed cam surfaces 91. Complementary cam members 92 are nonrotatably secured to the shaft 83 and are held in place by means of nuts 93. When the shaft is rotated the cooperating cam surfaces 91 will force the lugs 82 towards each other, and thereby contract the brake band and force it into engagement with the outer surface of the cylindrical part 37, for the purpose of locking the drum 34 against rotation, or for the purpose of providing a frictional retarding force, all as will be hereinafter more fully set forth.

Figure 2:
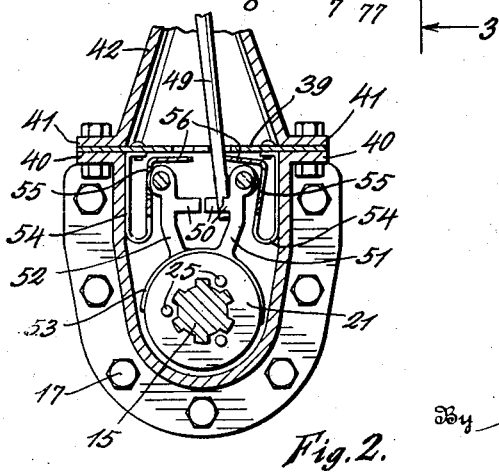
Fig. 2 is a section taken on line 2—2, Fig. 1 and shows a portion of the shifting mechanism.

When the parts are in the position shown in Figure 1, the gears are all in a neutral position and there is therefore no tendency for shaft 11 to rotate shaft 15 and the latter will, therefore, remain stationary, regardless of whether the drum 34 is free to rotate or not. Let us now assume that force has been applied to the plate 85 and that the brake band has been set against the drum 34 with sufficient force to prevent the drum from rotating. If handle 45 is now moved in such a way as to bring gear wheel 23 into mesh with gear 72, the driven shaft will be rotated at a comparatively slow speed through the operation of gears 29, 68, 72 and 23. This position may be designated as low gear position. If the speed of the driving shaft is to be increased with respect to the driven shaft, gear 23 is moved to neutral position and gear 24 is shifted so as to bring it into mesh with gear 71. We now have an intermediate speed at which the shaft rotates more nearly at the same speed as the driving shaft. To bring the parts into the position in which the driving and driven shafts rotate at the same speed, gear 24 is moved towards the left (Fig. 1) until it meshes with the gear wheel 67. Gear 67 is about three times as wide as gear 24 so that these gears will remain in mesh during a considerable movement of the gear 24. When gear 24 is in mesh with gear 67, shaft 15 is driven through the medium of gears 30, 66, 67 and 24. Gears 66 and 67 have the same pitch diameter and gears 30 and 24 are also of the same pitch diameter and therefore shafts 11 and 15 will be rotated at the same speed and in the same direction. Attention is now directed to gears 27 and 28. It will be observed that gear 27 has an internal clutch of such size that it will receive the gear 28 so as to form a splined connection by means of which a direct drive is obtained between the driving and the driven shafts. As soon as gears 27 and 28 are brought into mesh, it is evident that power can be transmitted directly between the shafts and therefore gears 66 and 67 are no longer necessary for this purpose. After the shafts have been directly connected in the manner explained, it is immaterial whether drum 34 remains stationary or whether it is free to rotate, but for the purpose of providing a service brake, I have provided means for locking the drum against relative rotation with respect to the driving and driven shafts. This means comprises a gear wheel 69, which is adapted to be engaged by gear 24 when the latter is moved to its extreme left hand position. As gears 68 and 69 are of different diameters, there is a differential action which prevents the drum from rotating with respect to the shafts and it must therefore rotate at the same speed as the driving shaft. When parts are in this position, the drum 34 acts merely as a brake drum by means of which the operation of the automobile or other machine can be controlled. When the shafts 11 and 15 are driven through the gears 68, 71 and 72, the drum 34 must remain stationary for if it does not it will rotate and thereby change the gear ratio between the shafts. It is apparent, however, that even when running in gears the brake can be used for controlling the speed so as to obtain a flexibility of operation, that is very serviceable when driving a car through a heavy traffic congested street, as by the simple expedient of releasing, retarding or stopping the rotation of the drum a great variation in speed may be obtained.

I want to call particular attention to the means which I employ for bringing the driving and driven shafts into synchronism just before the internal gear 27 is brought into contact with gear 28, as this prevents the gear teeth from being stripped by this operation. In connection with this I wish to call attention to the fact that the teeth on gear 28 and the grooves between the teeth of the internal gear 27 must be brought into alignment when the rotation of the shafts is synchronized, and this is accomplished by properly positioning the gears 30, 66 and 67 with respect to the teeth on gear 24.

From the above it will be apparent that I have produced a transmission gear set which is a simple construction and which permits great flexibility of operation. This gear set, as above intimated, possesses some of the characteristics of a planetary gear, as well as all of the advantages of a sliding gear transmission. In addition to this I have provided means for bringing the driving and driven shaft into synchronism just before they are directly connected and for converting the drum member which carries the several gears into a service brake drum.

It will be apparent that the parts can be readily lubricated by partly filling the enclosing casing with oil, which will be distributed over the various bearing parts when the drum rotates, or when the gears rotate within the drum.

I want to call attention to Figure 3 and to the fact that countershafts 60 and 61 are located on one side of the center, while countershaft 59 is located on the opposite side. It is obvious that unless special precautions are taken the drum will become unbalanced and liable to be subjected to severe vibration when rotating at a high speed. To prevent this, the parts attached to countershaft 59 have been made much heavier than would be required for strength so as to produce a counter balance that will give smooth running.

In the specification I have called attention to the fact that when the driven shaft 15 is rotated through the operation of the gears that the drum 34 is usually clamped against rotation but that it may be permitted to slip to some extent whenever this is desirable. It is evident that if the drum 34 is free to rotate, that no rotation will be transmitted to shaft 15 and therefore the brake acts in the same manner as a clutch. It is well known that the ordinary clutch is very unaccessible and that if it has to be repaired it necessitates a large amount of labor and consequent expense. My brake band on the other hand can be readily replaced as it is easily accessible. The brake band can be made much wider than has been shown in the drawing, if this is found to be necessary.

Having thus described my invention, what I claim as new is:

1. A transmission gear set having aligned, relatively rotatable driving and driven shafts, a drum mounted for rotation about the common axis of said shafts, a countershaft carried by said drum, said countershaft being spaced from and parallel with the axis of rotation, a plurality of gears nonrotatably secured to the countershaft, a gear secured to the driving shaft and operatively connected with one of the gears on the countershaft, two gears slidably connected with the driven shaft, means for selectively moving said gears into mesh with a cooperating gear on the countershaft and means for locking the drum against rotation.

2. A transmission gear set having aligned, relatively rotatable driving and driven shafts, bearings in which said shafts are journalled, a drum enclosing the adjacent ends of and rotatable about the common axis of the shafts, a countershaft carried by said drum, said countershaft being parallel with and spaced from the axis of rotation of the drum, a plurality of rigidly interconnected, spaced gears rotatably mounted on the countershaft, a gear on the driving shaft operatively connected with one of the gears on the countershaft, two gears slidably connected with the driven shaft, means for selectively moving the slidable gears into and out of mesh with cooperating gears on the countershaft and means for locking the drum against rotation.

3. A transmission gear set having aligned, relatively rotatable driving and driven shafts, bearings in which said shafts are journalled, a drum enclosing the adjacent ends of and rotatable about the common axis of the shafts, a countershaft carried by said drum, said countershaft being parallel with and spaced from the axis of rotation of the drum, a plurality of rigidly interconnected, spaced gears rotatably mounted on the countershaft, a gear on the driving shaft operatively connected with one of the gears on the countershaft, two gears slidably connected with the driven shaft, means for selectively moving the slidable gears into and out of mesh with cooperating gears on the countershaft, means for locking the drum against rotation and means for directly connecting the driving and the driven shafts.

4. A transmission gear set having aligned, relatively rotatable driving and driven shafts, bearings in which said shafts are journalled, a drum enclosing the adjacent ends of and rotatable about the common axis of the shafts, a countershaft carried by said drum, said countershaft being parallel with and spaced from the axis of rotation of the drum, a plurality of rigidly interconnected, spaced gears rotatably mounted on the countershaft, a gear on the driving shaft operatively connected with one of the gears on the countershaft, two gears slidably connected with the driven shaft, means for selectively moving the slidable gears into and out of mesh with cooperating gears on the countershaft, means for locking the drum against rotation, means for directly connecting the driving and the driven shafts, and means carried by the drum for counterbalancing the weight of the countershaft and associated gears.

5. A transmission gear set having aligned, relatively rotatable driving and driven shafts, bearings in which said shafts are journalled, a drum enclosing the adjacent ends of and rotatable about the common axis of the shafts, two countershafts carried by said drum, said countershafts being spaced from and parallel with the axis about which the drum rotates, a plurality of rigidly interconnected gears carried by each of said countershafts, one gear on each countershaft being in operative engagement with a cooperating gear on the driving shaft, two gears slidably connected with the driven shaft, means for moving one of said slidable gears into and out of operative engagement with one of the gears on one of the countershafts, means for moving the other slidable gear into and out of operative engagement with a gear on the other countershaft, means carried by the last named slidable gear for producing a direct coupling between the driving and the driven shafts and a brake mechanism for holding the drum against rotation.

6. A transmission gear set having aligned, relatively rotatable driving and driven shafts, bearings in which said shafts are journalled, a drum enclosing the adjacent ends of and rotatable about the common axis of the shafts, two countershafts carried by said drum, said countershafts being spaced from and parallel with the axis about which the drum rotates, a plurality of rigidly interconnected gears carried by each of said countershafts, one gear on each countershaft being in operative engagement with a cooperating gear on the driving shaft, two gears slidably connected with the driven shaft, means for moving one of said slidable gears into and out of operative engagement with one of the gears on one of the countershafts, means for moving the other slidable gear into and out of operative engagement with a gear on the other countershaft, means carried by the last named slidable gear for producing a direct coupling between the driving and the driven shafts, means which is made effective on further movement of the last named slidable gear for locking the drum against relative rotation with respect to the driven shaft and brake mechanism operatively associated with the drum.

7. A transmission gear set having aligned, relatively rotatable driving and driven shafts, bearings in which said shafts are journalled, a drum enclosing the adjacent ends of and rotatable about the common axis of the shafts, two countershafts carried by said drum, said countershafts being spaced from and parallel with the axis about which the drum rotates, a plurality of rigidly interconnected gears carried by each of said countershafts, one gear on each countershaft being in operative engagement with a cooperating gear on the driven shaft, two gears slidably connected with the driven shaft, means for moving one of said slidable gears into and out of operative engagement with one of the gears on one of the countershafts, means for moving the other slidable gear into and out of operative engagement with a gear on the other countershaft, means carried by the last named slidable gear for producing a direct coupling between the driving and the driven shafts, means for causing the driven shaft to be rotated in the opposite direction from that of the driving shaft and a brake mechanism for holding the drum against rotation.

8. A transmission gear set having aligned, relatively rotatable driving and driven shafts, bearings in which said shafts are journalled, a drum enclosing the adjacent ends of and rotatable about the common axis of the shafts, two countershafts carried by said drum, said countershafts being spaced from and parallel with the axis about which the drum rotates, a plurality of rigidly interconnected gears carried by each of said countershafts, one gear on each countershaft being in operative engagement with a cooperating gear on the driven shaft, two gears slidably connected with the driven shaft, means for moving one of said slidable gears into and out of operative engagement with one of the gears on one of the countershafts, means for moving the other slidable gear into and out of operative engagement with a gear on the other countershaft, means carried by the last named slidable gear for producing a direct coupling between the driving and the driven shafts, a third countershaft carried by the drum, two rigidly interconnected gears rotatably carried thereby, one of said gears being in mesh with a gear on one of said countershafts and the other being so located that it will mesh with the first mentioned slidable gear in one of its positions whereby the driven shaft will be made to rotate in the opposite direction from that in which the driving shaft rotates and a brake mechanism for locking the drum against rotation.

9. A transmission gear set having aligned, relatively rotatable driving and driven shafts, bearings in which said shafts are journalled, a drum enclosing the adjacent ends of and rotatable about the common axis of the shafts, two countershafts carried by said drum, said countershafts being spaced from and parallel with the axis about which the drum rotates, a plurality of rigidly interconnected gears carried by each of said countershafts, one gear on each countershaft being in operative engagement with a cooperating gear on the driven shaft, two gears slidably connected with the driven shaft, means for moving one of said slidable gears into and out of operative engagement with one of the gears on one of the countershafts, means for moving the other slidable gear into and out of operative engagement with a gear on the other countershaft, means carried by the last named slidable gear for producing a direct coupling between the driving and the driven shafts, a third countershaft carried by the drum, two rigidly interconnected gears rotatably carried thereby, one of said gears being in mesh with a gear on one of said countershafts and the other being so located that it will mesh with the first mentioned slidable gear in one of its positions whereby the driven shaft will be made to rotate in the opposite direction from that in which the driving shaft rotates, a brake mechanism for locking the drum against rotation, and means for locking the brake in operative position.

10. A sliding gear transmission comprising aligned drive and driven shafts, a rotatable drum, a countershaft rotatably mounted in said drum, gears connecting the driving shaft to the countershaft slidable gears for connecting the driven shaft to the countershaft and means comprising a brake mechanism for holding said drum against rotation.

11. A sliding gear variable speed transmission having aligned driving and driven shafts, a countershaft whose axis is parallel with the common axis of the drive and driven shafts, means for supporting said countershaft so that it may rotate about the axis of the drive shaft, gears for connecting the drive shaft to the countershaft, means comprising gears slidably but non-rotatably secured to the driven shaft for connecting the latter with the countershaft, means for selectively moving the slidable gears and means for preventing the countershaft from moving about the axis of the drive shaft.

12. A sliding gear variable speed transmission having aligned driving and driven shafts, a countershaft whose axis is parallel with the common axis of the drive and driven shafts, means for supporting said countershaft so that it may rotate about the axis of the drive shaft, gears for connecting the drive shaft to the countershaft, means comprising gears slidably but nonrotatably secured to the driven shaft for connecting the latter with the countershaft, means for selectively moving the slidable gears, means for preventing the countershaft from moving about the axis of the drive shaft, means comprising a second countershaft for connecting the drive and driven shafts so that they will rotate in synchronism, and means for producing a direct connection between said shafts.

13. A sliding gear variable speed transmission having aligned driving and driven shafts, a countershaft whose axis is parallel with the common axis of the drive and driven shafts, means for supporting said countershaft so that it may rotate about the axis of the drive shaft, gears for connecting the drive shaft to the countershaft, means comprising gears slidably but nonrotatably secured to the driven shaft for connecting the latter with the countershaft, means for selectively moving the slidable gears, means for preventing the countershaft from moving about the axis of the drive shaft, means comprising a second countershaft for connecting the drive and driven shafts so that they will rotate in synchronism, means for producing a direct connection between said shafts and means made effective after the shafts have been directly connected for locking the countershafts against rotation about the common axis of the driving and the driven shafts.

14. In a transmission gear set, a drive shaft and a driven shaft in axial alignment, a countershaft, means for rotatably supporting the countershaft so that it may rotate about the common axis of the drive and driven shaft, two gears rotatably mounted on the countershaft, one of said gears being in mesh with a gear carried by the drive shaft, a gear slidably but nonrotatably connected with the driven shaft, said last named gear having a cylindrical hub provided with teeth adapted to engage notches on the drive shaft so as to produce a direct connection between the shafts and means for moving said slidable gear on the driven shaft so as to bring it into mesh with the other gear on the countershaft so as to bring both shafts into synchronism and for directly connecting the shafts after they are brought into synchronism.

In testimony whereof I affix my signature.

IRA OTIS THORLEY.